US010737349B2

(12) United States Patent
Heimann et al.

(10) Patent No.: US 10,737,349 B2
(45) Date of Patent: Aug. 11, 2020

(54) MEASURING DEVICE FOR AUTOMATED WELDING DEVICES, IN PARTICULAR FOR ROBOT WELDING TONGS

(71) Applicant: Inelta Sensorsysteme GmbH & Co., Ottobrunn (DE)

(72) Inventors: Jochen Heimann, Neubiberg (DE); Michael Fiala, Inning am Ammersee (DE)

(73) Assignee: INELTA SENSORSYSTEME GMBH & CO. KG, Ottobrunn (DE)

( * ) Notice: Subject to any disclaimer, the term of this patent is extended or adjusted under 35 U.S.C. 154(b) by 336 days.

(21) Appl. No.: 15/750,456

(22) PCT Filed: Aug. 5, 2016

(86) PCT No.: PCT/EP2016/068791
§ 371 (c)(1),
(2) Date: Feb. 5, 2018

(87) PCT Pub. No.: WO2017/021544
PCT Pub. Date: Feb. 9, 2017

(65) Prior Publication Data
US 2018/0236591 A1 Aug. 23, 2018

(30) Foreign Application Priority Data
Aug. 5, 2015 (DE) .......................... 10 2015 214 931

(51) Int. Cl.
*B23K 11/28* (2006.01)
*B23K 11/11* (2006.01)
(Continued)

(52) U.S. Cl.
CPC ............. *B23K 11/28* (2013.01); *B23K 11/115* (2013.01); *B23K 11/255* (2013.01);
(Continued)

(58) Field of Classification Search
CPC ...... B23K 11/253; B23K 11/255; G01L 1/005
(Continued)

(56) References Cited

U.S. PATENT DOCUMENTS 3,076,333 A * 2/1963 Hankes ..................... G01B 3/46
                                                                      73/862.638
3,222,923 A * 12/1965 Lebow ................. G01L 5/0076
                                                                      73/862.541
(Continued)

FOREIGN PATENT DOCUMENTS

CN         201783774 U      4/2011
CN         203738219 U      7/2014
(Continued)

OTHER PUBLICATIONS

Chinese First Office Action for Chinese Application No. 201680045946.7 dated Nov. 1, 2019 (7 pages).
(Continued)

Primary Examiner — David P Angwin
Assistant Examiner — Nicholas A Ros
(74) Attorney, Agent, or Firm — Reising Ethington, P.C.

(57) ABSTRACT

The disclosure relates to a measuring device (1) for automated welding devices, in particular for robot welding tongs with a housing (18); with a holding piece (19); that is affixed inside the housing (18) and insulated against the housing (18) by means of a first insulating ring (2); that has a reception space (22) with a base wall (23) and an affixing appliance (24); and with a load cell (17) that is affixed inside the housing (18) opposite the base wall (23) and that is insulated against the housing (18) by means of a circumferential second insulating ring (5) and an insulating washer appliance (7, 21) located at the front-face side and adjacent to the base wall (23).

18 Claims, 8 Drawing Sheets

Figure 1:
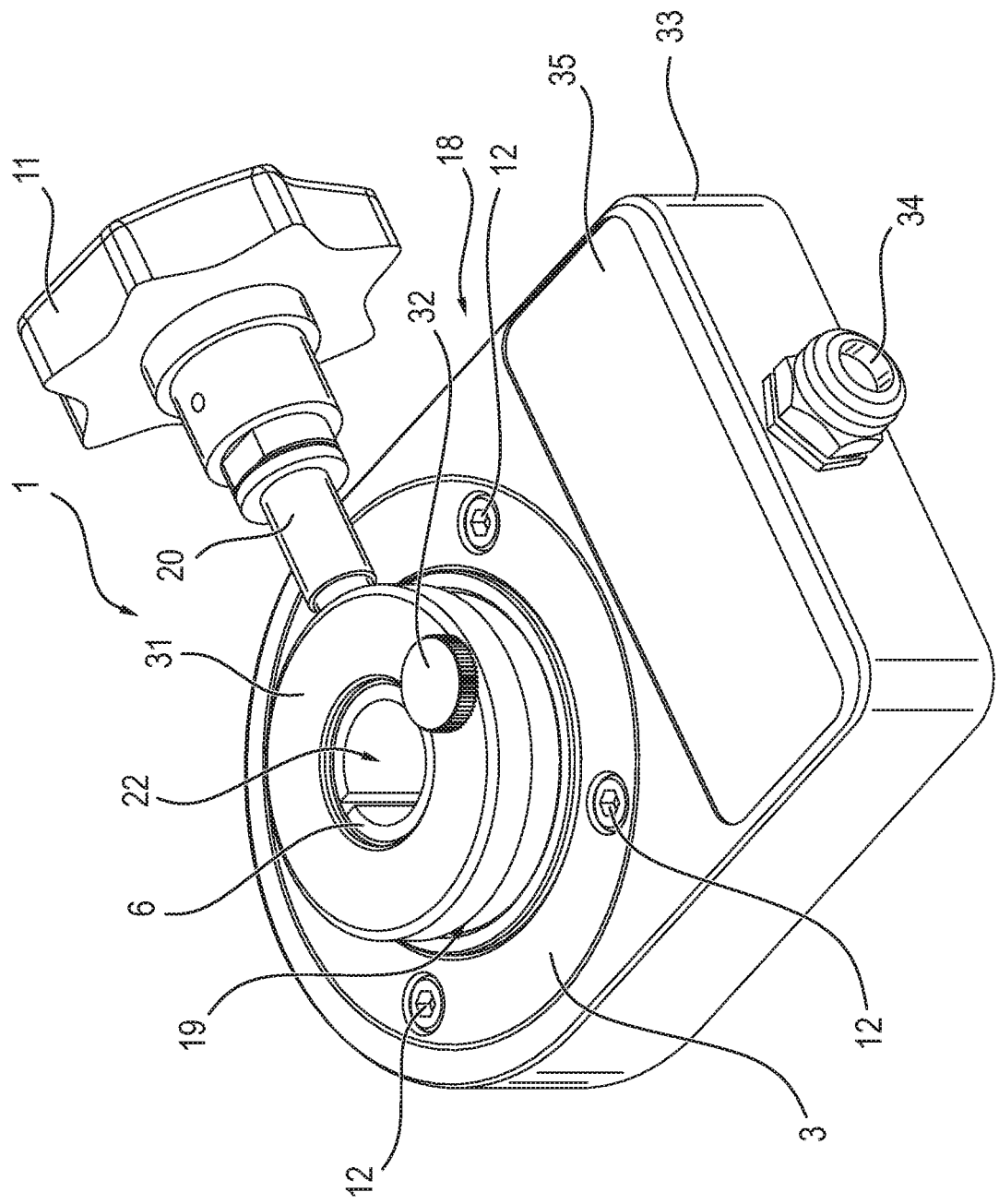

(51) Int. Cl.
*B23K 11/25* (2006.01)
*B23K 11/31* (2006.01)
*G01L 1/00* (2006.01)
*B23K 11/36* (2006.01)
*B23K 101/00* (2006.01)

(52) U.S. Cl.
CPC .......... *B23K 11/314* (2013.01); *B23K 11/364* (2013.01); *G01L 1/005* (2013.01); *B23K 2101/006* (2018.08)

(58) Field of Classification Search
USPC .......................... 219/91.2; 73/850, 855–856, 73/862.621–862.642
See application file for complete search history.

(56) References Cited

U.S. PATENT DOCUMENTS

| | | | |
|---|---|---|---|
| 5,504,299 A | 4/1996 | Heckendorn | |
| 5,608,173 A * | 3/1997 | Brendel | B23K 11/255 |
| | | | 73/763 |
| 6,184,487 B1 * | 2/2001 | Visscher | B23K 11/30 |
| | | | 219/91.1 |
| 7,021,157 B2 * | 4/2006 | Nastasi, Jr. | B23K 11/253 |
| | | | 73/856 |
| 8,902,607 B1 * | 12/2014 | Chang | G01R 31/2834 |
| | | | 361/788 |

FOREIGN PATENT DOCUMENTS

| | | | |
|---|---|---|---|
| DE | 69614429 T2 | 5/2002 | |
| DE | 10127112 A1 | 8/2002 | |
| GB | 2134267 * | 8/1984 | ............... G01L 1/22 |
| GB | 2134267 A | 8/1984 | |
| IE | 10224402 A1 | 12/2003 | |
| JP | 2004034146 A | 2/2004 | |
| JP | 2009241108 A | 10/2009 | |

OTHER PUBLICATIONS

International Search Report for International Application PCT/EP2016/068791, dated Oct. 18, 2016, 3 pages.

English Translation of International Search Report for International Application PCT/EP2016/068791, dated Oct. 18, 2016, 2 pages.

* cited by examiner

MEASURING DEVICE FOR AUTOMATED WELDING DEVICES, IN PARTICULAR FOR ROBOT WELDING TONGS

The disclosure relates to a measuring device according to claim 1.

Welding tongs, in particular for resistance spot welding, play an important role in the body construction of motor vehicles, among other areas, with the use of such welding tongs (robot welding tongs) being simple and flexible.

However, when it comes to the use of such welding tongs, there is the problem that flaws at the welding tongs or faulty process parameters during welding may lead to production waste or faulty parts if not detected in time In order to be able to detect defects early on, measuring devices are used by means of which a force measurement of the joining process can be performed by determining the force transmission of the electrodes of the welding tongs.

What is known from DE 101 27 112 A1 is a welding head with a feed shaft and an electrode that may be moved via a cylinder, with a pressure sensor being provided for detecting different parameters.

What is known from DE 102 24 402 A1 are welding tongs for electrical resistance welding with two electrodes that have a force sensor for detecting a force value between the two electrodes. Interfering edges are to be avoided through the arrangement of this sensor, wherein the force sensor is arranged at one of the electrode arm supports.

What is known from DE 696 14 429 T2 is a resistance welding sensor construction for monitoring parameters of the resistance welding method.

Known from GB 2 134 267 A is a sensing element comprising a coil that is arranged between two metal membrane parts and is insulated from them. Projections protrude from the membrane parts into opposite ends of a bore that is located centrally inside the coil. The facing front faces of the coil are separated by insulating material, which allows for the projections to move towards each other if a load is applied to the membrane parts along the axis of the coil bore.

Thus, it is an objective of the present disclosure to create a measuring device for robot welding tongs that can be handled in an easy and safe manner as compared to known measuring devices.

The objective may be achieved by means of the features of claim 1.

The subclaims contain advantageous further developments of the disclosure.

The measuring device according to the disclosure has a housing/electronic housing that, for one thing, comprises a holding piece for temporarily affixing an electrode of welding tongs and, for another thing, a load cell at which the second electrode of the welding tongs can be made to abut so as to determine the force transmission of the electrodes of the welding tongs.

Advantageously, the measuring device according to the disclosure can be used during start-up of the welding tongs, or also during a service interval. Due to the fact that the measuring device can be temporarily fixed at one of the two electrodes by means of the holding piece, it is not necessary for an operator to hold the measuring device by hand during the actual measuring processes in the course of which the second electrode is applied at the load cell, which is not only easier but also safer for an operator.

In addition to a reception area for the holding piece and the load cell, the electronic housing of the measuring device can advantageously further comprise a reception area for an electronics compartment inside of which an electronics circuit board arrangement suitable for obtaining measurement values can be arranged, and which can be in signal connection with an evaluation unit via a cable output.

Instead of a reception area for an electronics compartment it is also possible to form the respective area of the housing as an elongated handle that connects to the holding piece and extends in the longitudinal direction of the housing and can receive the electronics circuit board arrangement. Such a handle can also be provided as a replaceable part, so that it for example becomes possible to provide various electronics circuit board arrangements in such replacement parts to adjust to different frame conditions, so that only the handle has to be exchanged for an adjustment, should an adjustment of the electronics circuit board arrangement should become necessary.

In a further particularly preferred embodiment of the measuring device according to the disclosure, the circuit board arrangement is provided with a radio transmission device and is in operative connection with the same, wherein the radio transmission device can comprise a transmission as well as a receiving function. Such an embodiment can be arranged inside the electronics compartment as well as inside the handle. In particular this type of circuit board arrangement, just as the electronics circuit board arrangement with a cable output, can be supplied with energy with an autonomous power supply integrated in the measuring device, such as for example an accumulator arrangement or a battery arrangement.

Further, it is possible to combine the load cell with so-called load buttons of different designs. What is understood by such a load button is an arrangement that is comprised of an abutment piece and an outer threaded pin that can be screwed into the internal thread of the load cell. In this manner, it is possible to attach contact surfaces with different contours to the load cell. Such contact surfaces can be formed in a flat or planar, concave or convex manner, depending on the shape of the electrode that is to be applied at the load button. Such adjustments may be useful, since the electrodes of welding tongs are subject to wear and tear during their operation and thus may change their shape, so that the adjustment of the contact surface of the load cell to the correspondingly resulting shape of the electrode ensures a more precise force measurement.

An advantage of load buttons that can be combined with the load cell is that the structure of the measuring device itself does not have to be altered, but instead adjustments to an optimal shape for supporting the respective electrode can be carried out in a simple manner simply by exchanging the load buttons.

Figure 2:
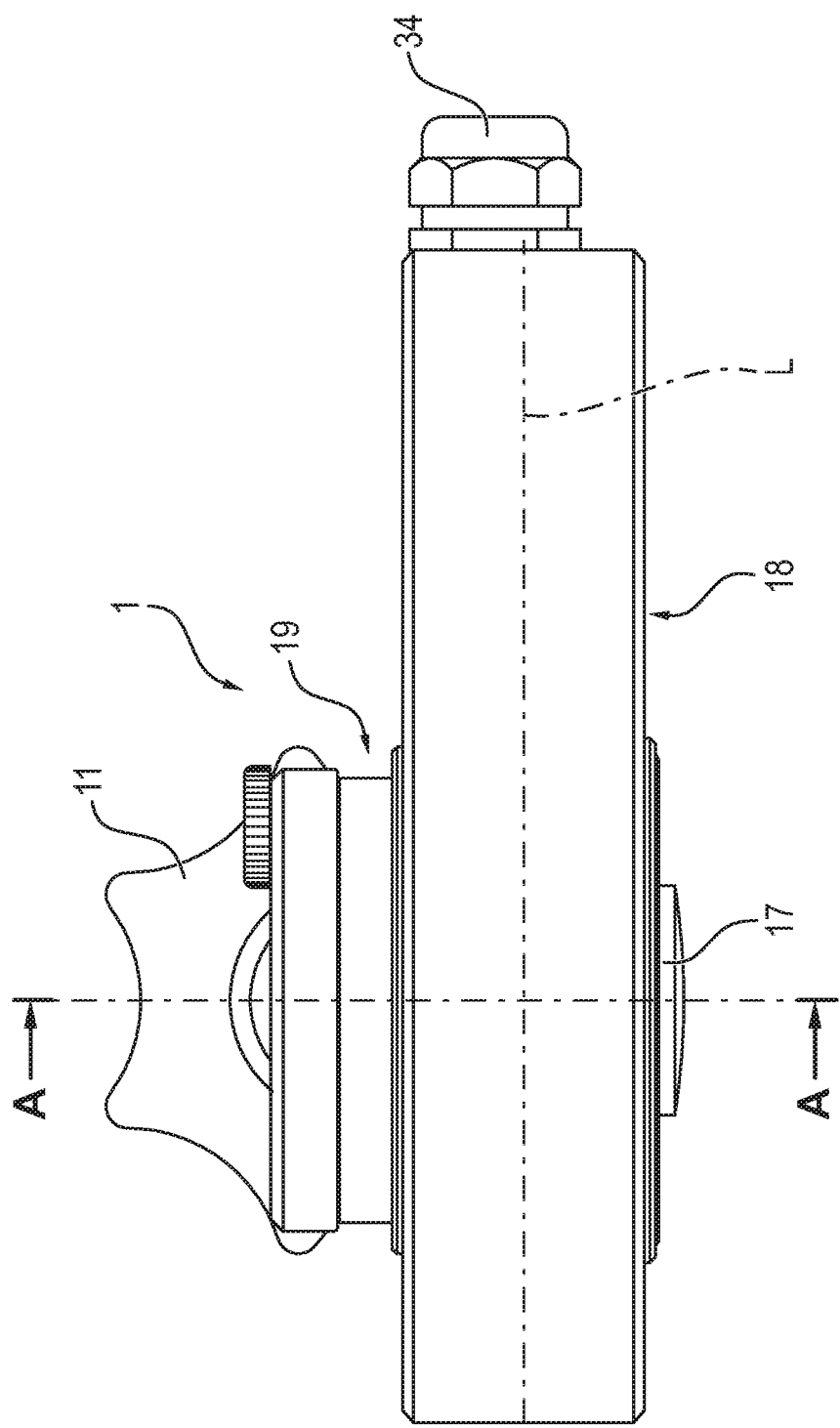
Figure 3A:
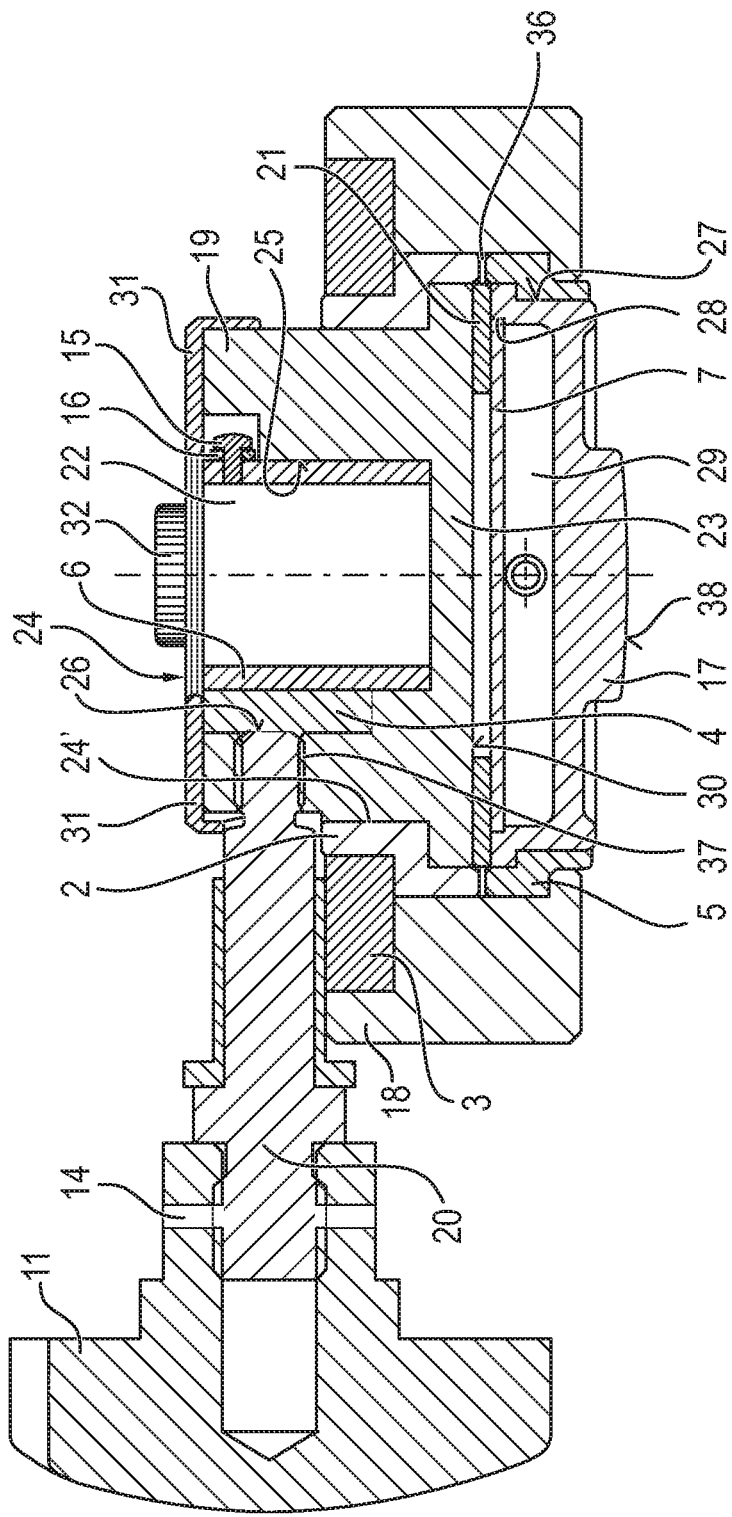
Figure 3B:
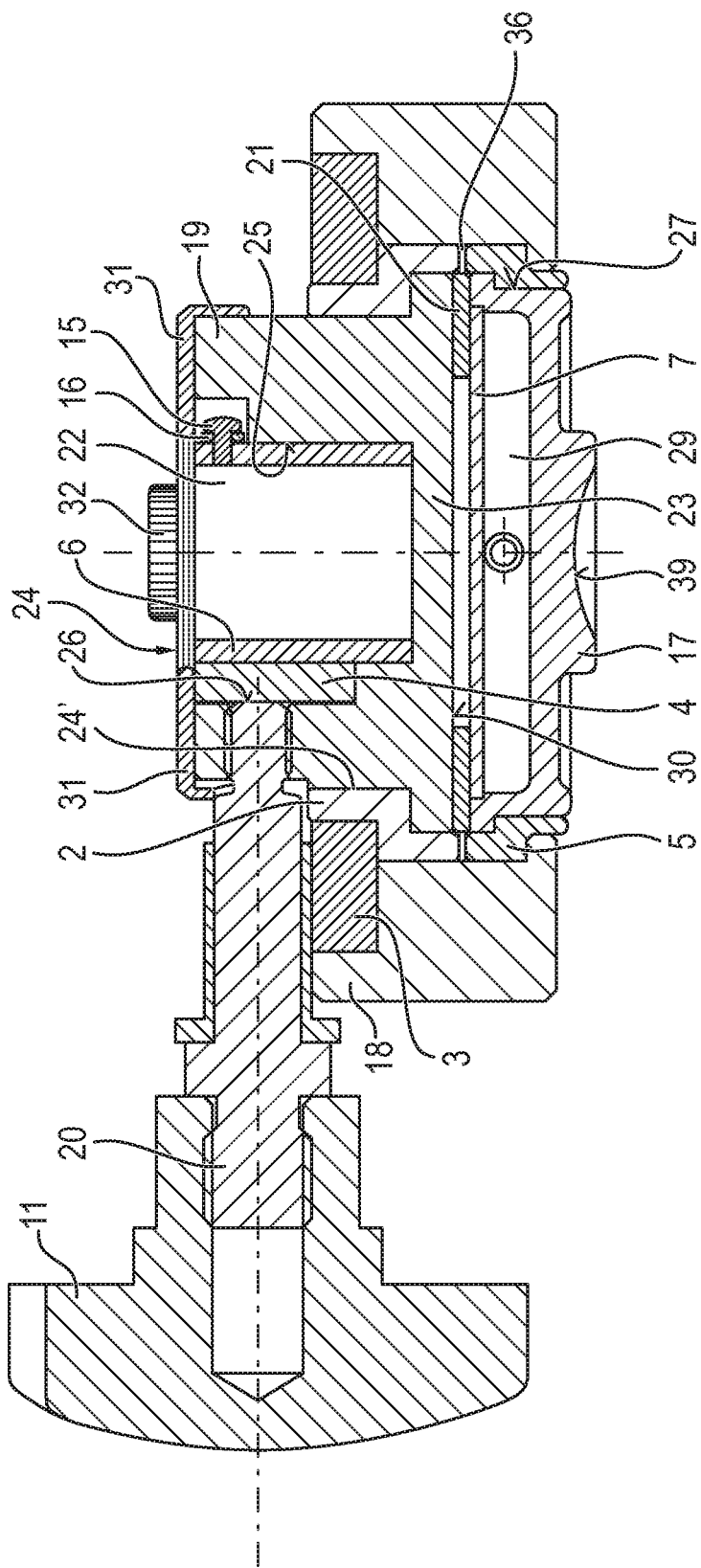
Figure 4:
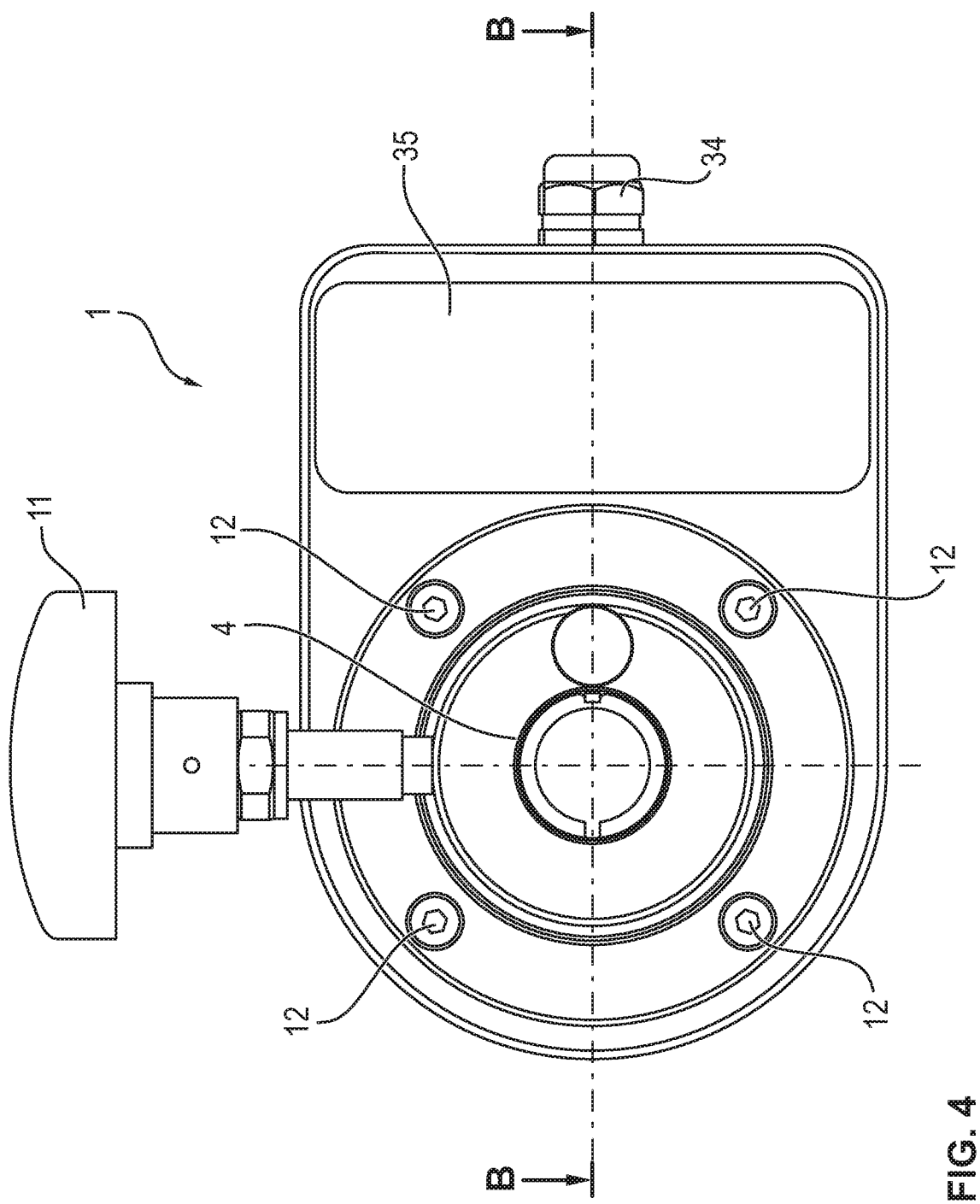
Figure 5:
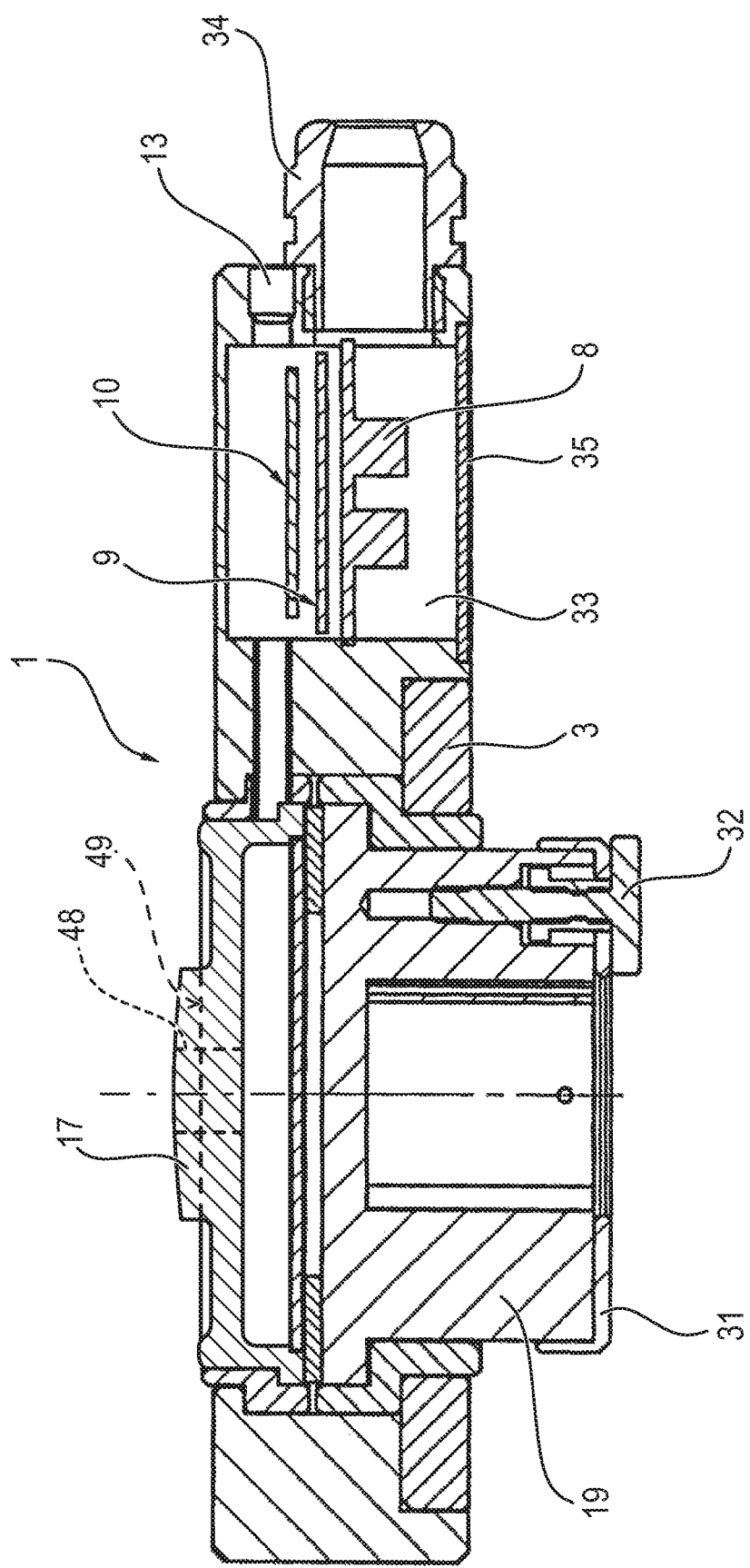
Figure 6:
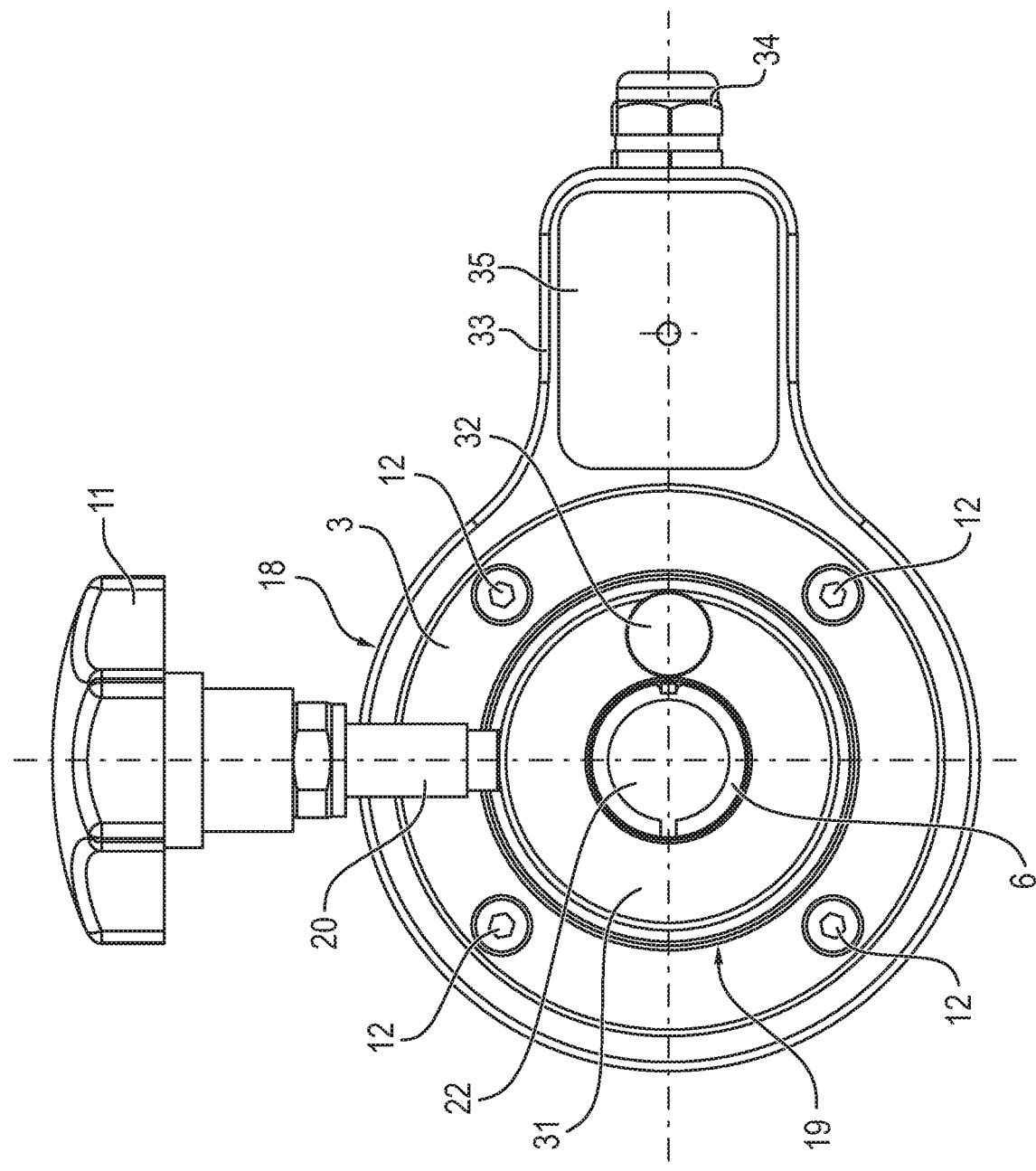
Figure 7A:
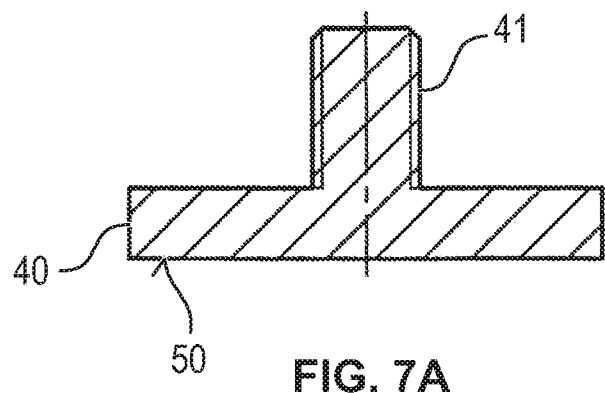
Figure 7B:
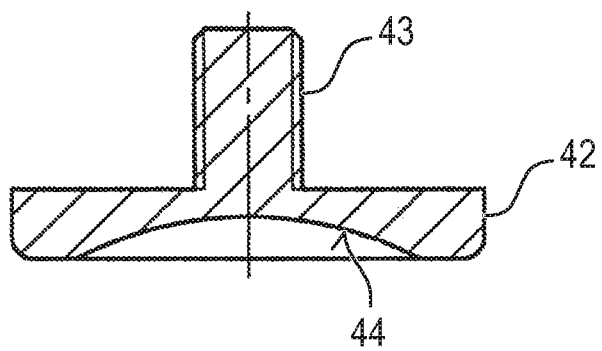
Figure 7C:
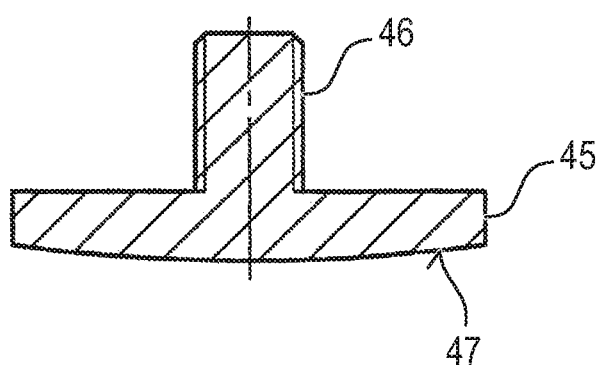

Further details, advantages and features of the present disclosure become apparent from the following description of an exemplary embodiment based on the drawing. Herein:

FIG. 1 shows, in a schematic manner, a slightly simplified perspective rendering of an embodiment of a measuring device according to the disclosure, FIG. 2 shows a side view of the measuring device according to FIG. 1, FIGS. 3 A, B show sectional renderings of two embodiments of the measuring device according to the disclosure based on line A-A in FIG. 2, FIG. 4 shows a top view of the measuring device according to FIG. 1, FIG. 5 shows a sectional rendering of the measuring device along line B-B in FIG. 4, FIG. 6 shows a rendering of a further embodiment of the measuring device according to the disclosure, and FIGS. 7A to 7C show, in a schematic manner, strongly simplified renderings of load buttons that can be combined with the measuring device according to the disclosure.

The structure and function of a measuring device for robot welding tongs 1 according to the disclosure—which, however, are not shown in detail in the Figures—becomes apparent as the renderings of FIGS. 1 to 5 are viewed in combination.

The measuring device 1 has a housing/electronic housing 18. As is particularly illustrated in the sectional rendering of FIG. 3, a cup-like holding piece 19 is arranged in an area of the housing 18 that is electrically insulated against the housing 18 by means of a first insulating ring 2. The insulating ring 2 is embodied in a stepped manner and surrounds a correspondingly stepped outer contour 24' of the holding piece 19, as can be seen in FIG. 3.

The holding piece 19 has a reception space 22 with a base wall 23. The reception space 22 serves for receiving an electrode of a robot welding tong that can be temporarily affixed in this reception space 22 by means of an affixing appliance 24 for the purpose of carrying out a measurement.

A load cell 17 is arranged opposite the holding piece 19, according to the rendering selected in FIG. 3 in the bottom area of the housing 18. Here, the load cell 17 is affixed inside the housing 18 opposite the base wall 23, for example by means of a screw connection or the like, and is electrically insulated against the housing 18 by means of a circumferentially arranged second insulating ring 5, as well as by means of an insulating washer appliance 7, 21 arranged at the front-face side.

As shown in FIGS. 3A and 3B, the second insulating ring 5 is also embodied in a stepped manner corresponding to a stepped outer contour 27 of the load cell 17, and circumferentially abuts the outer contour 27 of the load cell to electrically insulate the latter circumferentially against the housing 18.

The insulating washer appliance preferably has a first insulating washer 7 that is inserted into an annular groove 28 of the load cell 17 located at the front-face side and facing towards the base wall 23. In this way, the first insulating washer 7 covers a cell space 29 over its entire surface. In the case that the load cell 17 has its own insulation, this first insulating washer 7 is not necessary.

Further, the insulating washer appliance has a second insulating washer 21 in the form of a disc ring that is arranged between the base wall 23 and the first insulating washer 7, and that abuts the insulating washer 7 as well as, at the edge side, an outer surface 30 of the base wall 23, as is shown in detail in FIGS. 3A and 3B. However, a gap 36 between facing front faces of the first insulating ring 2 and of the second insulating ring 5 shows that these two insulating rings do not abut each other, because a force transmission of the electrodes to be attached takes place via the insulating washer 21.

The affixing appliance 24 has a clamping ring 6 that is arranged in the reception space 22 abutting an inner circumferential surface 25, and which is formed in a slit manner, as shown particularly in FIG. 1.

At the outer side, a shim 4 abuts this clamping ring 6, in turn acting together with a tensioning screw arrangement that abuts at the shim 4 via a front face of a threaded bolt 20. Apart from the threaded bolt 20, the tensioning screw arrangement further has a handling element 11, in particular in the form of a star grip that is connected to the threaded bolt 20. FIG. 3 illustrates a recess 14 for the connection between the handling element 11 and the threaded bolt into which a clamp screw or a clamping bolt or similar connection elements can be inserted for being able to connect the handling element 11 to the threaded bolt 20 in a rotationally fixed manner. At the end side, the threaded bolt 20 is screwed into an internal thread 37 of the holding piece 19, and can thus press together the clamping ring 6 due to its slit embodiment by means of the shim 4 to temporary affix an electrode tip that is inserted into the reception space 22.

FIGS. 3A and 3B further show an arrangement of a hexagon socket screw 15 and a possibly provided washer 16 that is attached at the clamping ring 6. The hexagon socket screw 15 serves as a locator, so that the slit of the clamping ring 6 is aligned at a 90° angle with respect to the tensioning screw arrangement. Further, the hexagon socket screw 15 also serves as a loss-prevention device for the clamping ring 6 in connection with a cover 31, which will be described in more detail in the following.

As can further be seen, in particular by viewing FIGS. 1, 3A, 3B and 4 in combination, in the particularly preferred embodiment shown herein, the holding piece 19 is connected to the housing 18 by means of a ring-shaped screw-on flange 3, for which purpose for example four hexagon socket screws 12 can be used, as is shown in FIG. 4.

Finally, as is particularly shown in FIGS. 1, 3A, 3B and 5, the holding piece 19 is provided with a ring-shaped cover 31 that is attached at the holding piece 19 in a detachable manner by means of a locating screw 32 which is supported in a captive manner at the cover 31 to secure the elements arranged inside the holding piece 19 against falling out.

With the help of this arrangement, it is possible to mount the holding piece 19 inside the housing 18 in a rotatable manner, wherein the holding piece 19 can be rotated via the handling element 11 and the threaded bolt 20.

The difference between the embodiments of FIG. 3A and FIG. 3B can be seen in the embodiment of a contact surface of the load cell 17. In the embodiment according to FIG. 3A, this contact surface is identified by the reference sign 38, and is embodied in a convex manner, i.e., is embodied so as to be curved outwards or away from the load cell 17.

In the embodiment according to FIG. 3B, this contact surface is identified by the reference sign 39, and in this case is embodied in a concave manner, i.e., is embodied so as to be curved in the direction towards the load cell 7.

In principle, it is also possible to respectively embody the mentioned contact surfaces in a flat or planar manner.

This is illustrated in FIGS. 7A to 7C, wherein the embodiment according to FIG. 7A shows a load button 40 provided with an outer threaded pin 41 and having a flat or planer contact surface 50.

Provided in the embodiment according to 7B is a load button 42 which is again provided with an outer threaded pin 43. However, in this case, the contact surface 44 is formed in a concave manner.

The embodiment according to FIG. 7C shows a load button 45 that is likewise provided with an outer threaded pin 46, with its contact surface 47 also being embodied in a convex manner. The outer threaded pine 41, 43 or 46 can respectively be screwed into the internal thread of the load cell 17 that is shown by a dashed line and indicated by the reference sign 48 in FIG. 5. If the contact surfaces are provided by the load buttons, the corresponding surface of the load cell 47 is embodied in a flat manner, which is symbolically illustrated by the second dashed line 49 in FIG. 5.

Of course, instead of the load buttons it is in principle also possible to provide load cells having correspondingly adjusted contact surfaces, i.e., contact surfaces that are factory-formed with flat, concave or convex contact surfaces, should that be suitable for the respective application case.

Further, as illustrated particularly in FIGS. 4 and 5, the housing/electronic housing 18 is provided with an electronics compartment 33 that is arranged adjacent to the holding piece 19. Arranged inside the electronics compartment 33 is a circuit board arrangement, which may for example consist of the circuit boards 8, 9 and 10 that may be in signal connection with the load cell 17 and that can be signal-connected to an evaluation unit via a cable output 34.

The electronics compartment 33 can be closed by means of a cover 35, which is preferably detachable.

FIG. 6 shows, in a manner corresponding to FIG. 1, a rendering of a further embodiment of the measuring device 1 in which all features corresponding to the ones of FIG. 1 are provided with the same reference signs.

The contrast to the embodiment according to FIG. 1 is in the design of the electronics compartment 33 that is formed as a handle in this embodiment, wherein a comparison of FIGS. 1 and 6 illustrates that this configuration as a handle can be obtained through a narrower configuration of the electronics compartment 33.

To be able to perform a measuring process with the measuring device 1 according to the disclosure, an electrode of the robot welding tongs is inserted into the reception space 22 and is temporarily affixed inside it by means of the affixing appliance 24, as has already been mentioned. Thanks to this fixation, the measuring device 1 is fixated inside the robot welding tongs for the purpose performing the measuring process, without an operator having to hold the measuring device 1. After the affixing procedure, the second electrode is moved towards the load cell 17 so as to absorb the force input of the two electrodes, which can subsequently be used, for example for the purpose of monitoring, or for the purpose of adjustment, or for the purpose of troubleshooting or error detection.

In addition to the above written description of the disclosure, the drawn illustrations of the disclosure in FIGS. 1 to 7C are explicitly being referred to for additionally disclosing the invention.

PARTS LIST 1 measuring device
2 insulating ring
3 screw-on flange
4 shim
5 insulating ring
6 clamping ring
7 insulating washer
8-10 circuit boards
11 handling element/star grip
12 hexagon socket screw
13 grub screw
14 clamping sleeve
15 hexagon socket screw
16 washer
17 load cell
18 housing/electronic housing
19 holding piece
20 threaded bolt
21 insulating washer
22 reception space
23 base wall
24 affixing appliance
24' outer contour
25 inner circumferential surface
26 front face
27 outer contour
28 groove
29 cell space
30 outer surface
31 cover
32 locating screw
33 electronics compartment
34 cable output
35 cover
36 gap
37 internal thread
38, 39, 44, 47, 49, 50 contact surface
40, 42, 45 load buttons
41, 43, 46 outer threaded pine
48 internal thread
L longitudinal direction of the housing 18

The invention claimed is:

1. Measuring device for automated welding devices, in particular for robot welding tongs, the measuring device comprising:
   a housing;
   a holding piece,
      that is affixed inside the housing and is insulated against the housing by means of a first insulating ring, and
      that has a reception space with a base wall and an affixing appliance; and
   a load cell,
      that is affixed inside the housing opposite the base wall, and
      that is insulated against the housing by means of a circumferential second insulating ring and an insulating washer appliance located at a front-face side and adjacent to the base wall, wherein the affixing appliance has a clamping ring that is arranged inside the reception space and abuts an inner circumferential surface, and that acts together with a tensioning screw arrangement via a shim abutting it at an outer side, with the tensioning screw arrangement abutting the shim via a front face of a threaded bolt.

2. Measuring device according to claim 1, wherein the first insulating ring is embodied in a stepped manner corresponding to a stepped outer contour of the holding piece.

3. Measuring device according to claim 1, wherein the threaded bolt arrangement has a handling element, in particular in the form of a star grip, that is connected to the threaded bolt.

4. Measuring device according to claim 1, wherein the clamping ring is slit.

5. Measuring device according to claim 1 wherein the holding piece is affixed at the housing by means of a flange arrangement.

6. Measuring device according to claim 1, wherein the second insulating ring is embodied in a stepped manner corresponding to a stepped outer contour of the load cell.

7. Measuring device according to claim 1, wherein a ring-shaped cover is affixed on the holding piece in a detachable manner by means of a locating screw that is supported at the cover in a captive manner.

8. Measuring device according to claim 1, wherein contact surfaces of the load cell are adjusted to the application case and can be embodied in a flat, concave or convex manner.

9. Measuring device according to claim 1, wherein the housing has an electronics compartment adjacent to the holding piece.

10. Measuring device according to claim 9, wherein the electronics compartment is formed as a handle that extends in the longitudinal direction (L) of the housing.

11. Measuring device according to claim 9, wherein the electronics compartment is provided with a cable output.

12. Measuring device according to claim 9, wherein the electronics compartment is covered by means of a detachable cover.

13. Measuring device according to claim 9, wherein the electronics compartment has a circuit board arrangement.

14. Measuring device according to claim 13, wherein the load cell is in signal connection with the circuit board arrangement.

15. Measuring device according to claim 13, wherein the circuit board arrangement is in operative connection with a radio transmission device.

16. Measuring device according to claim 13, wherein an integrated autonomous power supply is provided for the circuit board arrangement inside the housing.

17. Measuring device for automated welding devices, in particular for robot welding tongs, the measuring device comprising:
   a housing;
   a holding piece,
      that is affixed inside the housing and is insulated against the housing by means of a first insulating ring, and
      that has a reception space with a base wall and an affixing appliance; and
   a load cell,
      that is affixed inside the housing opposite the base wall, and
      that is insulated against the housing by means of a circumferential second insulating ring and an insulating washer appliance located at a front-face side and adjacent to the base wall, wherein the insulating washer appliance comprises:
         a first insulating washer that is inserted into an annular groove of the load cell located at the front-face side and faces towards the base wall, and that covers a cell space, and
         a second insulating washer in the form of a disc ring that is arranged between the base wall and the first insulating washer, and that abuts the first insulating washer as well as, at the edge side, an outer surface of the base wall.

18. Measuring device for automated welding devices, in particular for robot welding tongs, the measuring device comprising:
   a housing;
   a holding piece,
      that is affixed inside the housing and is insulated against the housing by means of a first insulating ring, and
      that has a reception space with a base wall and an affixing appliance; and
   a load cell,
      that is affixed inside the housing opposite the base wall, and
      that is insulated against the housing by means of a circumferential second insulating ring and an insulating washer appliance located at a front-face side and adjacent to the base wall, wherein the holding piece is mounted inside the housing in a rotatable manner.

* * * * *

UNITED STATES PATENT AND TRADEMARK OFFICE
CERTIFICATE OF CORRECTION

PATENT NO. : 10,737,349 B2
APPLICATION NO. : 15/750456
DATED : August 11, 2020
INVENTOR(S) : Jochen Heimann et al.

It is certified that error appears in the above-identified patent and that said Letters Patent is hereby corrected as shown below:

On the Title Page

Item (71), Applicant Name:
Change "Inelta Sensorsysteme GmbH & Co." to "Inelta Sensorsysteme GmbH & Co. KG"

Signed and Sealed this
Sixteenth Day of August, 2022

Katherine Kelly Vidal
*Director of the United States Patent and Trademark Office*